US007500210B2

(12) United States Patent
Vinitzky et al.

(10) Patent No.: US 7,500,210 B2
(45) Date of Patent: Mar. 3, 2009

(54) CHIP AREA OPTIMIZATION FOR MULTITHREADED DESIGNS

(75) Inventors: Gil Vinitzky, Azur (IL); Eran Dagan, Tel Aviv (IL)

(73) Assignee: Mplicity Ltd., Tel Aviv (IL)

( * ) Notice: Subject to any disclaimer, the term of this patent is extended or adjusted under 35 U.S.C. 154(b) by 267 days.

(21) Appl. No.: 11/599,933

(22) Filed: Nov. 15, 2006

(65) Prior Publication Data

US 2008/0115100 A1  May 15, 2008

(51) Int. Cl.
*G06F 17/50* (2006.01)
(52) U.S. Cl. .................. 716/6; 716/2; 716/13; 716/14; 703/16
(58) Field of Classification Search .............. 716/6, 716/2, 13, 14; 703/16
See application file for complete search history.

(56) References Cited

U.S. PATENT DOCUMENTS

| | | | |
|---|---|---|---|
| 4,041,386 A * | 8/1977 | Thomas et al. ........... 324/76.18 |
| 4,484,272 A | 11/1984 | Green |
| 5,142,677 A | 8/1992 | Ehlig et al. |
| 5,568,646 A | 10/1996 | Jaggar |
| 5,598,546 A | 1/1997 | Blomgren |
| 5,758,115 A | 5/1998 | Nevill |
| 6,002,861 A * | 12/1999 | Butts et al. .................... 703/16 |
| 6,134,578 A | 10/2000 | Ehlig et al. |
| 6,223,208 B1 | 4/2001 | Kiefer et al. |
| 6,247,040 B1 | 6/2001 | Born et al. |
| 6,286,127 B1 * | 9/2001 | King et al. ...................... 716/8 |
| 6,542,921 B1 | 4/2003 | Sager |
| 6,982,570 B1 * | 1/2006 | Ang et al. ...................... 326/41 |
| 7,013,449 B2 * | 3/2006 | Schlansker et al. ............. 716/12 |
| 7,047,394 B1 | 5/2006 | Van Dyke et al. |
| 7,181,383 B1 * | 2/2007 | McGaughy et al. ........... 703/14 |
| 7,243,313 B1 * | 7/2007 | Qin et al. ........................ 716/2 |
| 7,392,170 B1 * | 6/2008 | McGaughy et al. ........... 703/14 |
| 7,409,328 B1 * | 8/2008 | McGaughy et al. ........... 703/14 |
| 2002/0004897 A1 | 1/2002 | Kao et al. |
| 2002/0162097 A1 * | 10/2002 | Meribout ..................... 717/155 |
| 2003/0046517 A1 | 3/2003 | Lauterbach |
| 2003/0135716 A1 | 7/2003 | Vinitzky et al. |
| 2005/0081018 A1 | 4/2005 | Luick |
| 2005/0097497 A1 * | 5/2005 | Schlansker et al. ............ 716/14 |
| 2006/0179364 A1 * | 8/2006 | Swaney et al. ............... 714/100 |

FOREIGN PATENT DOCUMENTS

WO   WO 2006/092792 A2   9/2006

OTHER PUBLICATIONS

U.S. Appl. No. 10/043,223.
David E. Culler, et al., "Parallel Computer Architecture", Morgan Kaufmann Publishers, Inc. San Francisco, California, Aug. 1998.

\* cited by examiner

*Primary Examiner*—Phallaka Kik
(74) *Attorney, Agent, or Firm*—Husch Blackwell Sanders LLP Welsh & Katz

(57) ABSTRACT

A method for circuit design includes performing a timing analysis of a design of a processing stage in an integrated electronic circuit, and specifying a cycle time of the circuit. Responsively to the cycle time and to the timing analysis, a window is identifying within the processing stage containing a set of connection points among the circuit components at which the processing stage may be split for addition of multithreading capability to the circuit. A subset of the connection points is selected, and splitter components are inserted at the connection points in the subset.

27 Claims, 6 Drawing Sheets

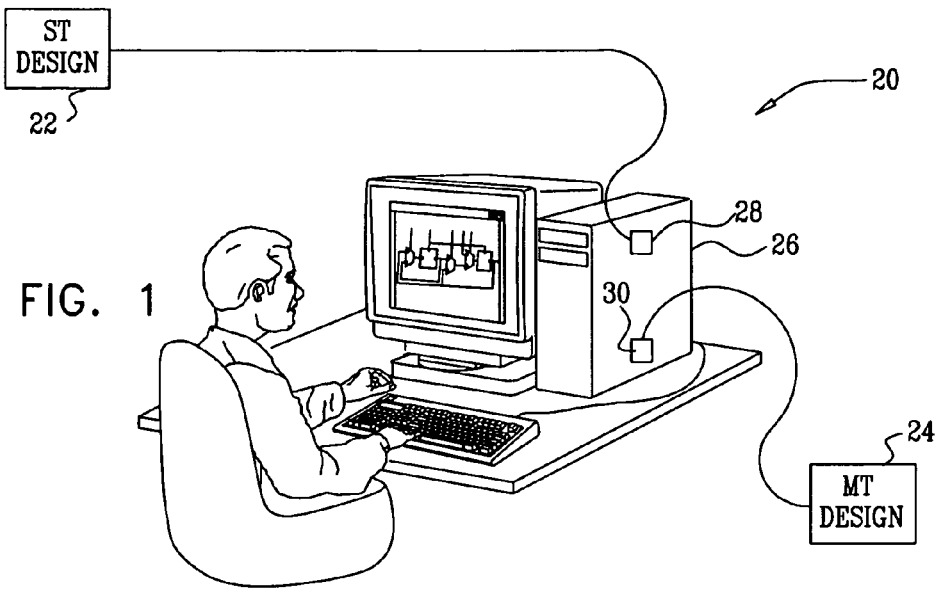
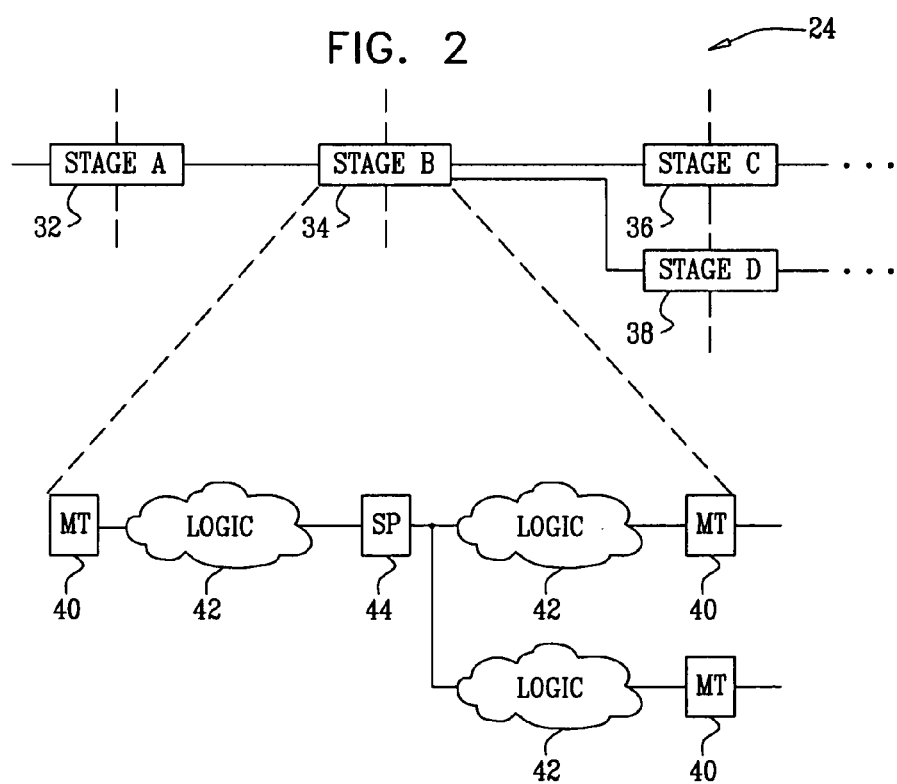

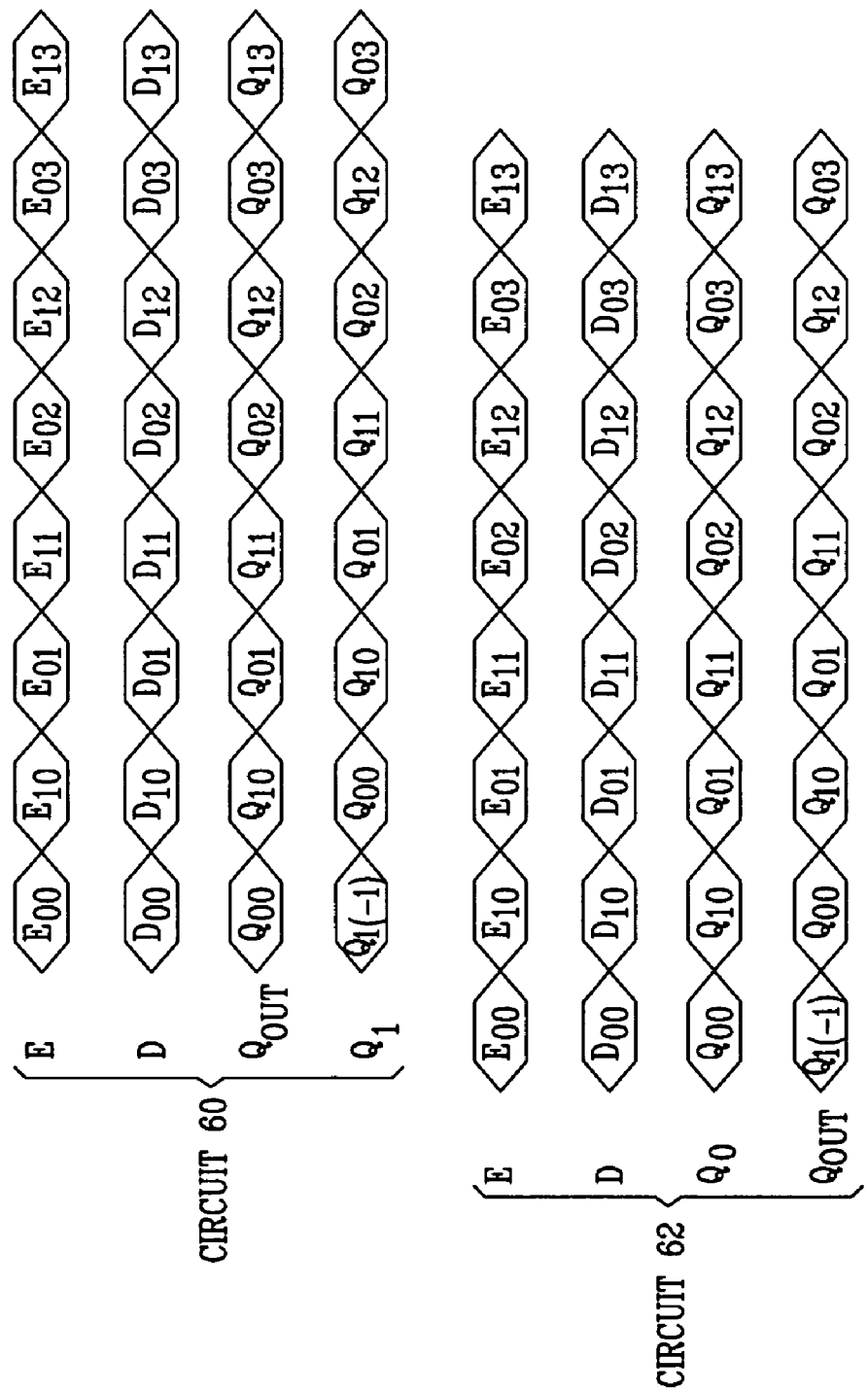

CHIP AREA OPTIMIZATION FOR MULTITHREADED DESIGNS

FIELD OF THE INVENTION

The present invention relates generally to integrated circuit design, and specifically to tools and techniques for adding multithreading support to existing digital circuit designs.

BACKGROUND OF THE INVENTION

Multithreading is commonly used to enhance the performance of modern microprocessors and programming languages. Multithreading may be defined as the logical separation of a processing task into independent threads, which are activated individually and require limited interaction or synchronization between threads. In a pipelined processor, for example, the pipeline stages may be controlled to process two or more threads in alternation and thus use the pipeline resources more efficiently.

U.S. Patent Application Publication US 2003/0046517 A1, whose disclosure is incorporated herein by reference, describes apparatus for facilitating multithreading in a computer processor pipeline. A logic element is inserted into a pipeline stage to separate it into first and second substages. A control mechanism controls the first and second substages so that the first substage can process an operation from a first thread, and the second substage can simultaneously process a second operation from a second thread.

U.S. Patent Application Publication US 2003/0135716 A1, whose disclosure is incorporated herein by reference, describes a method for converting a computer processor configuration having a k-phased pipeline into a virtual multithreaded processor. For this purpose, each pipeline phase of the processor configuration is divided into a plurality of sub-phases, and at least one virtual pipeline with k sub-phases is created within the pipeline. In this manner, a single physical processor can be made to operate as multiple virtual processors, each equivalent to the original processor.

SUMMARY OF THE INVENTION

Embodiments of the present invention provide tools and techniques that can be used for adding multithreading capability to an existing processor design. In some embodiments, these techniques may be used to modify a single-thread design to support two or more parallel threads. In other embodiments, these techniques may be applied, mutatis mutandis, to an existing multithread design in order to increase the number of threads that it will support. In alternative embodiments, the techniques described hereinbelow may be adapted for use in enhancing the efficiency and reducing the chip area of digital designs of other types, which may be single-threaded or multi-threaded, without necessarily increasing the number of threads that the design will support.

In some embodiments of the present invention, as described in detail hereinbelow, one or more logical components, referred to herein as a "splitters," are inserted into the design of a processing stage in order to split the stage into sub-stages for multithreading. Timing analysis of the processing stage is used to identify a window, i.e., a range of points at which the processing stage may be split and still satisfy the timing constraints of multithreaded operation. A process of optimization is applied to choose one or more points within the window at which to insert the splitters so as to minimize the number of components that must be added to the design (and thus minimize the additional area and power required for multithreading support on the integrated circuit chip). In some cases, it is possible to merge the splitter with another storage element and thus eliminate the splitter as a distinct component.

There is therefore provided, in accordance with an embodiment of the present invention, a method for circuit design, including:

performing a timing analysis of a design of a processing stage in an integrated electronic circuit, the processing stage including circuit components that are interconnected at connection points;

specifying a cycle time of the circuit;

responsively to the cycle time and to the timing analysis, identifying a window within the processing stage containing a set of the connection points among the circuit components at which the processing stage may be split for addition of multithreading capability to the circuit; and selecting a subset of the connection points, and inserting splitter components at the connection points in the subset.

In some embodiments, the digital processing stage has an input and an output, and performing the timing analysis includes determining respective input path lengths to the connection points from the input and respective output path lengths to the points from the output, and identifying the window includes finding the set of connection points having both input and output path lengths that are no greater than a predetermined fraction of the cycle time. In a disclosed embodiment, the digital processing stage is to be modified from single-threaded operation to dual-threaded operation, and the window includes the set of connection points having both input and output path lengths that are no greater than half the cycle time. Optionally, specifying the cycle time includes increasing the specified cycle time so as to enlarge the set of connection points falling within the window.

In a disclosed embodiment, inserting the splitter components includes providing multithreading cells at the input and the output of the processing stage, and merging a splitting functionality with at least one of the multithreading cells without splitting the processing stage at any of the connection points intermediate the input and the output.

In some embodiments, selecting the subset of the connection points includes choosing the subset so as to minimize a number of the splitter components that must be inserted in the processing stage in order to enable multithreaded operation of the processing stage. Typically, choosing the subset includes analyzing two or more candidate subsets of the connection points at which the splitter components can be inserted, and selecting the subset from among the candidate subsets.

There is also provided, in accordance with an embodiment of the present invention, apparatus for circuit design, including:

an input interface, which is coupled to receive a design of a processing stage in an integrated electronic circuit, the processing stage including circuit components that are interconnected at connection points; and a design processor, which is arranged, responsively to a timing analysis of the processing stage and to a specified cycle time of the circuit, to identify a window within the processing stage containing a set of the connection points among the circuit components at which the processing stage may be split for addition of multithreading capability to the circuit, to select a subset of the connection points, and to insert splitter components at the connection points in the subset.

There is additionally provided, in accordance with an embodiment of the present invention, a computer software product, including a computer-readable medium in which program instructions are stored, which instructions, when read by a computer, cause the computer to receive a design of a processing stage in an integrated electronic circuit, the processing stage including circuit components that are interconnected at connection points, and to identify, responsively to a timing analysis of the processing stage and to a specified cycle time of the circuit, a window within the processing stage containing a set of the connection points among the circuit components at which the processing stage may be split for addition of multithreading capability to the circuit, and to select a subset of the connection points, and to insert splitter components at the connection points in the subset so as to enable multithreaded operation of the processing stage.

There is further provided, in accordance with an embodiment of the present invention, a method for circuit design, including:

receiving a design of a processing stage in an integrated electronic circuit, the processing stage having an input and an output with a predetermined timing relationship therebetween, and including circuit components, which include one or more splitter components and one or more storage components having connections to the input and the output;

performing a timing analysis of the design to identify a signal timing dependence between the splitter components and the storage components; and responsively to the timing analysis, eliminating at least one of the splitter components while altering at least one of the connections of the storage components so as to preserve the timing relationship between the input and the output.

In a disclosed embodiment, the splitter components include flip-flops.

There is moreover provided, in accordance with an embodiment of the present invention, apparatus for circuit design, including:

an input interface, which is coupled to receive a design of a processing stage in an integrated electronic circuit, the processing stage having an input and an output with a predetermined timing relationship therebetween, and including circuit components, which include one or more splitter components and one or more storage components having connections to the input and the output; and a design processor, which is arranged to perform a timing analysis of the design to identify a signal timing dependence between the splitter components and the storage components, and to eliminate, responsively to the timing analysis, at least one of the splitter components while altering at least one of the connections of the storage components so as to preserve the timing relationship between the input and the output.

There is furthermore provided, in accordance with an embodiment of the present invention, a computer software product, including a computer-readable medium in which program instructions are stored, which instructions, when read by a computer, cause the computer to receive a design of a processing stage in an integrated electronic circuit, the processing stage having an input and an output with a predetermined timing relationship therebetween, and including circuit components, which include one or more splitter components and one or more storage components having connections to the input and the output, wherein the instructions cause the computer to perform a timing analysis of the design to identify a signal timing dependence between the splitter components and the storage components, and to eliminate, responsively to the timing analysis, at least one of the splitter components while altering at least one of the connections of the storage components so as to preserve the timing relationship between the input and the output.

The present invention will be more fully understood from the following detailed description of the embodiments thereof, taken together with the drawings in which:

BRIEF DESCRIPTION OF THE DRAWINGS

FIG. 1 is a schematic, pictorial illustration of a system for integrated circuit design, in accordance with an embodiment of the present invention;

FIG. 2 is a block diagram that schematically illustrates a processor design in which a processing stage is split into sub-stages, in accordance with an embodiment of the present invention;

FIG. 5 is a timing diagram that schematically shows input and output signals of the circuits of FIGS. 4A and 4B;

DETAILED DESCRIPTION OF EMBODIMENTS

Figure 3:
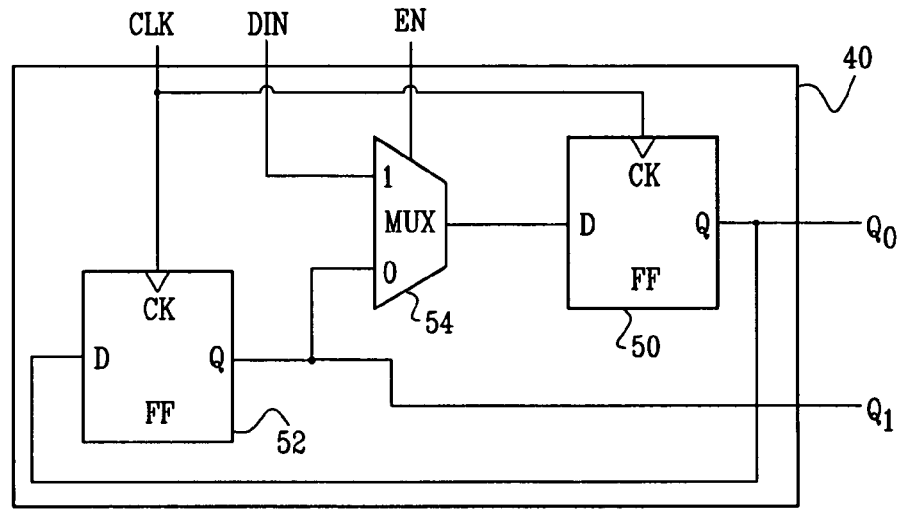
FIG. 3 is a schematic circuit diagram illustrating a storage cell for multithreading, in accordance with an embodiment of the present invention.

FIG. 1 is a schematic pictorial illustration of a system 20 for integrated circuit design, in accordance with an embodiment of the present invention. The system processes an input design 22 of a given processor in order to generate an output design 24 with similar functionality and added multithreading capability. System 20 comprises a design processor 26, having an input interface 28 for receiving the input design and an output interface 30 for delivering the multithreaded output design. The input design may be provided in a suitable design language, such as register transfer language (RTL), or it may have already been synthesized in the form of a netlist. The output design may be generated in similar form.

Processor 26 typically comprises a general-purpose computer, which is programmed in software to perform the functions that are described herein. This software may be downloaded to processor 26 in electronic form, over a network, for example, or it may alternatively be furnished on tangible media, such as optical, magnetic or electronic memory media. The software may be supplied as a stand-alone package, or it may alternatively be integrated with other electronic design automation (EDA) software. Thus, input interface 28 and output interface 30 of the processor may comprise communication interfaces for exchanging electronic design files with other computers or storage components, or they may alternative comprise internal interfaces within a multi-function EDA system.

In the examples that follow, input design 22 is assumed, for the sake of simplicity and clarity, to be a single-thread (ST) design, while the output multithread (MT) design 24 is assumed to support dual threads. The principles of the present invention may be applied, however, in generating output designs that support three or more simultaneous threads, starting from input designs that may be either single-thread or multithread. Further details regarding techniques for adding multithreading capability to existing designs are described in the above-mentioned U.S. Patent Application Publication US 2003/0135716 A1, as well as in PCT patent application PCT/IL2006/000280, filed Mar. 1, 2006, which is assigned to the assignee of the present patent application and whose disclosure is incorporated herein by reference.

FIG. 2 is a block diagram that schematically illustrates output design 24 following adaptation of the design for dual-threaded processing, in accordance with an embodiment of the present invention. Input design 22 is assumed to comprise processing stages 32, 34, 36, 38, each of which is divided into two successive sub-stages in output design 24. This process is illustrated specifically with respect to stage 34: Multithreading (MT) cells 40 are typically inserted between stages in order to store the machine states of the alternating threads that are processed successively by each stage. Static timing analysis is applied to logic 42 of stage 34 in order to determine where to insert a splitter (SP) 44 in between the logic components. The splitter may comprise any suitable separator between the preceding and succeeding phases, such as a D-flipflop for each bit that is to be transferred.

As a result of splitting stage 34, the portion of the stage to the left of splitter 44 can execute an instruction in one thread, while the portion to the right of the splitter executes an instruction in another thread. The location of the splitter is determined, as described in detail hereinbelow, so that the logical blocks on each side of the splitter execute within one cycle of the device clock. As a result, the single-thread processor of input design 22 is converted to a dual-thread processor. A novel circuit analysis technique is used to determine where to place the splitters in order to achieve optimal timing performance with a minimal number of added splitters, as described in detail hereinbelow.

The principles illustrated by FIG. 2 and the techniques described below for implementing these principles may be used not only for dual-threaded processing, but also in circuits for N-threaded processing, with N>2. Furthermore, by appropriate arrangement of the input/output (I/O) busses to a multithread processing circuit that is created in accordance with these principles, the circuit can be made to emulate a multi-core processor (with a separate I/O bus for each of the "virtual cores"). References to multithread designs and processing capability in the present patent application and in the claims should therefore be understood to include this sort of multi-core emulation.

FIG. 3 is a schematic circuit diagram that shows details of MT cell 40, in accordance with an embodiment of the present invention. This cell is appropriate for storing a single bit in each of two threads, which are arbitrarily labeled thread 0 and thread 1. Typically, multiple cells of this sort are arranged in parallel to contain multi-bit thread data. One flipflop 50 holds the state of thread 0 (marked $Q_0$ in the figure), while another flipflop 52, in cascade with flipflop 50, holds the state of thread 1 ($Q_1$). A multiplexer 54 determines, at each clock cycle, whether new data (DIN) for thread 0 will enter flipflop 50, or whether the contents of flipflop 52 will be transferred into flipflop 50 at the next clock cycle. The multiplexer is controlled by an enable (EN) input. Optionally, for increased versatility of thread selection and control, output Q of flipflop 50 may be connected as an additional input for selection by multiplexer 54.

The design of cell 40 that is shown in FIG. 3 is advantageous in its simplicity and small area and power consumption. Alternatively, other types of multithreading cells may be used to store thread states between the stages of design 24. For example, although cell 40 shown in FIG. 3 is intended to support two threads, if output design 24 is to support N threads, N>2, then the multithreading cells that are used in the design may comprise N cascaded flipflops. As another example, the design principles described hereinbelow may be applied to multithreading cells that comprise a number of parallel flipflops, each holding data for one thread, with a multiplexer to select the contents of one of the flipflops for output. As still another example, the storage function of the multithreading cell may be combined with computational functions that are performed at the beginning or end of the processing stage that is to be split.

Figure 4A:
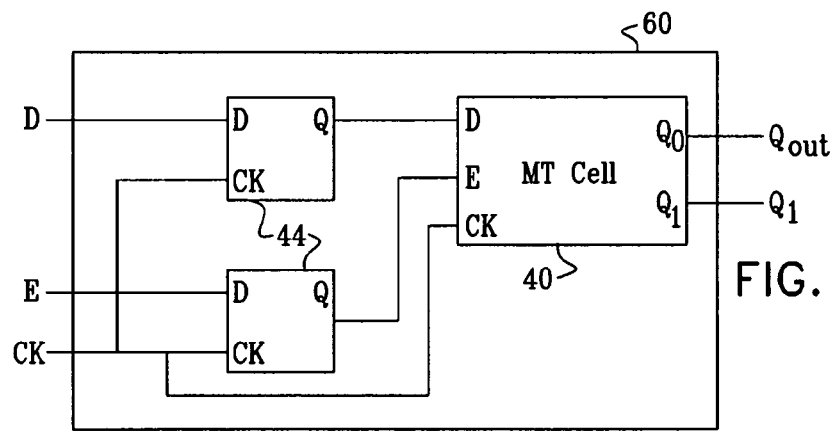
FIG. 4A is a schematic circuit diagram illustrating a multithreading support circuit, in accordance with an embodiment of the present invention.
Figure 4B:
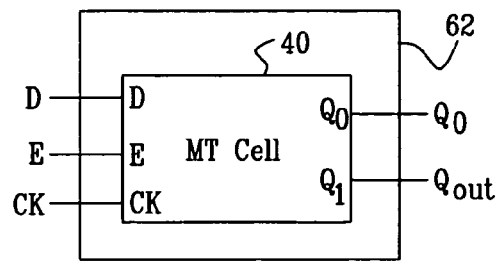
FIG. 4B is a schematic circuit diagram illustrating an optimized version of the multithreading support circuit of FIG. 4A, in accordance with an embodiment of the present invention.

Reference is now made to FIGS. 4A and 4B, which are schematic circuit diagrams that illustrate a technique that may be used to reduce the number of splitters needed to add multithreading capability to a processing circuit 60, in accordance with an embodiment of the present invention. It is assumed in this case that analysis of the circuit design and timing concluded that splitters 44 could be placed at the end of the processing stage, immediately before MT cell 40, with no other intervening logic. This sort of circuit configuration could also result, for example, from automated circuit analysis and optimization performed by register retiming tools that are used in electronic design automation (EDA) systems. Thus, in circuit 60, signal paths marked D and E are broken by splitters 44, which then provide D (DIN) and E (EN) as outputs to MT cell 40. The MT cell provides an output $Q_{out} = Q_0$ of the current thread to the next stage of the design, while the $Q_1$ output of the MT cell is unused.

The effect of splitters 44 in the location in which they are shown in FIG. 4A is simply to introduce a one-cycle delay into both of the D and E inputs to MT cell 40. These splitters, in other words, change the phase of the output of the MT cell, but otherwise do not affect the output data. Consequently, an optimized processing circuit 62, shown in FIG. 4B, may be used in place of circuit 60. In the optimized stage, splitters 44 are eliminated from inputs D and E. (If there were a splitter on only one of inputs D and E, this sort of elimination would not be possible.) To maintain proper signal timing in the absence of these splitters, the output $Q_{out}$ of circuit 62 is connected to the output $Q_1$ of splitter 40, which is one cycle behind $Q_0$.

FIG. 5 is a signal timing diagram that schematically shows the respective inputs and outputs of circuits 60 and 62, in accordance with an embodiment of the present invention. The upper four signal lines show the inputs and outputs of circuit 60 (FIG. 4A), while the lower four signal lines show the inputs and outputs of stage 62A (FIG. 4B), for the same sequence of inputs E and D. The output $Q_{out}$ is identical in both cases, with a uniform time shift of one cycle. Thus, the timing relationship between the inputs and outputs of circuit 60 are preserved in circuit 62. Circuit 62 may be thus used to the same effect as circuit 60, while eliminating the need for splitters 44, and thus reducing the chip area and power needed to implement the design.

Similar strategies may be used to eliminate splitters at other points in multithreaded designs. For example, a splitter immediately following $Q_{out} = Q_0$ of MT cell 40 may be eliminated simply by rewiring $Q_{out} = Q_1$. As another example, in some cases, the function of a splitter may be combined with an existing storage element within the processing stage in question. Such splitters may be used to separate processing stages in logic designs that are not necessarily multithreaded. Eliminating or reducing the number of the splitters can reduce the chip area and power consumption of such designs, as well. Splitter reduction tools implementing the methods described herein may be particularly useful, for example, in connection with register relocation techniques that are implemented in EDA tool suites.

Figure 6A:
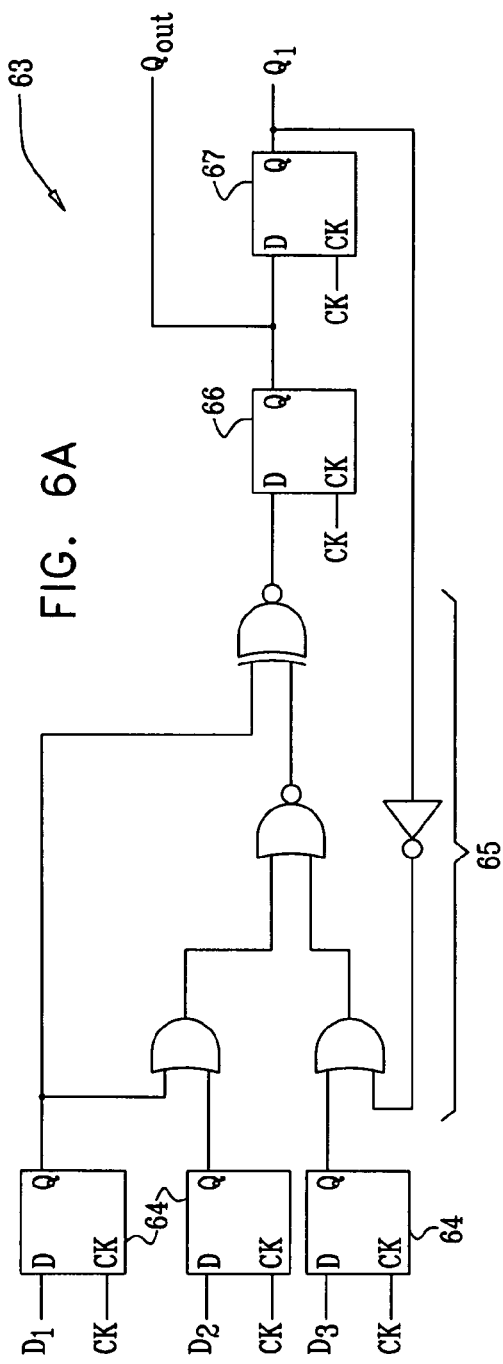
FIGS. 6A and 6B are schematic circuit diagrams illustrating a method for optimizing a logic circuit, in accordance with an embodiment of the present invention.
Figure 6B:
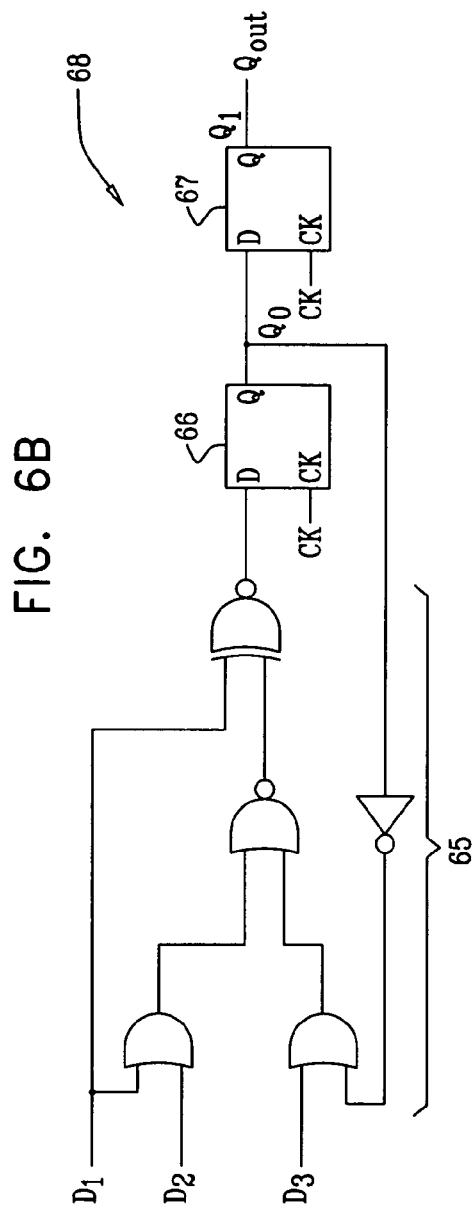

FIGS. 6A and 6B are schematic circuit diagrams that schematically illustrate the application of the principles explained above to optimize the design of a logic circuit 63, in accordance with an embodiment of the present invention. FIG. 6A shows circuit 63 before optimization, while FIG. 6B shows an optimized circuit 68, in which splitters 64 have been eliminated.

As shown in FIG. 6A, inputs $D_1$, $D_2$ and $D_3$ to circuit 63 are buffered by splitters 64 (in the form of D-flipflops, as in the preceding embodiment). A logic network 65, including a feedback link, processes the inputs an generates an output $Q_{out}$. Storage elements 66 and 67 (also embodied as D-flipflops) buffer the output and the feedback signal.

In optimized circuit 68, splitters 64 have been eliminated, and their timing function has been transferred to storage elements 66 and 67. To maintain proper timing, the output of circuit 68 is now taken from storage element 76, while the feedback link comes from storage element 66. An analysis of the timing of circuits 63 and 68, similar to the analysis shown above in FIG. 5, demonstrates that the logical operation and input/output timing relationship of the two circuits is equivalent.

Figure 7:
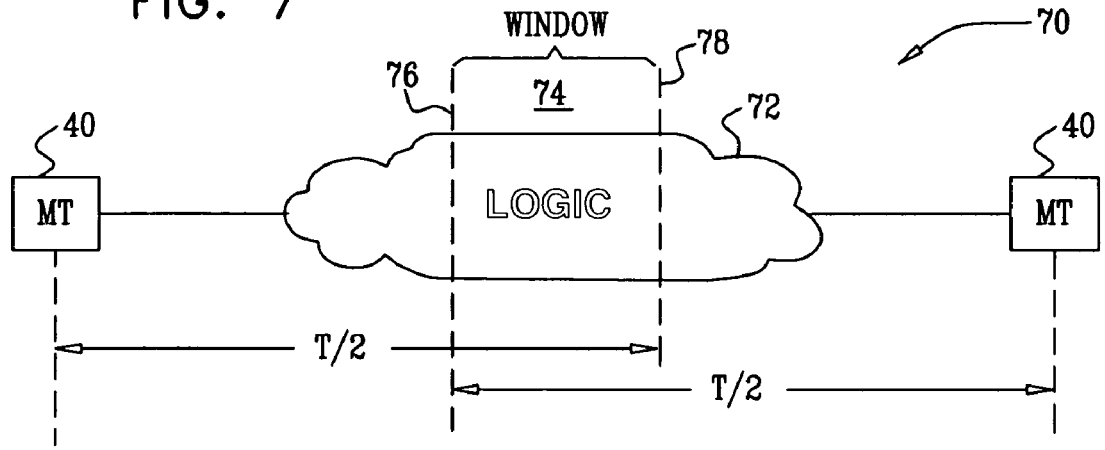
FIG. 7 is a block diagram that schematically illustrates a processing stage, showing timing considerations with regard to splitting the stage into sub-stages for multithreading, in accordance with an embodiment of the present invention.

FIG. 7 is a block diagram that schematically illustrates a processing stage 70, showing timing considerations with regard to splitting the stage into substages for multithreading, in accordance with an embodiment of the present invention. Stage 70 comprises logic circuits 72, bounded by MT cells 40. It is assumed in this example that each stage of the original single-thread design is expected to execute within a clock cycle of duration T. Thus, in dual-threaded operation, each sub-stage should executed within half a clock cycle, T/2.

As noted above, system 20 (FIG. 1) performs a static timing analysis in order to determine where to place splitters 44 in stage 70. This timing analysis defines a window 74 in which splitters may be placed. The size of the window is determined by the requirement that each of the sub-stages defined by the splitters must be capable of execution within T/2. Thus, the window has a leading boundary 76 at points having an output path length (i.e., the time needed for execution of the remaining logic components between these points and the end of stage 70) equal to T/2. The window has a trailing boundary 78 at points having an input path length (time for execution from the beginning of stage 70 to the points) of T/2. In other words, all the points in the window have input and output path lengths no greater than T/2.

In general, the splitters may be placed anywhere within window 74, as long as timing constraints among parallel components in the window are observed, and each of the resulting sub-stages will complete execution within T/2. When a number of different splitter locations are possible, it is advantageous to place the splitters in such as way as to minimize the number of separate splitters that must be used. A method for optimizing splitter placement under these conditions is described hereinbelow with reference to FIGS. 8 and 9. The timing limit T (or equivalently, T/2) may be relaxed in order to give a larger window and thus enlarge the number of locations at which the splitters may be placed. As a result, it may be possible to reduce the number of splitters still further, at the possible expense of slower execution.

Stages on the critical timing path of the design, however, typically take substantially the entire clock cycle to complete execution. Therefore, in these stages, leading and trailing boundaries 76 and 78 will coincide, and there will be little or no flexibility available in choosing the placement of the splitters. The splitters in such cases will split the stage into two sub-stages that each take approximately T/2 to execute.

On the other hand, in some cases, the time required for execution of an entire stage in the input design may be T/2 or less. In this case, the function of the splitters may be combined with MT cells 40, as shown above in FIGS. 4B and 5, for example, so that the splitters themselves may be eliminated entirely from this stage of the design.

Figure 8:
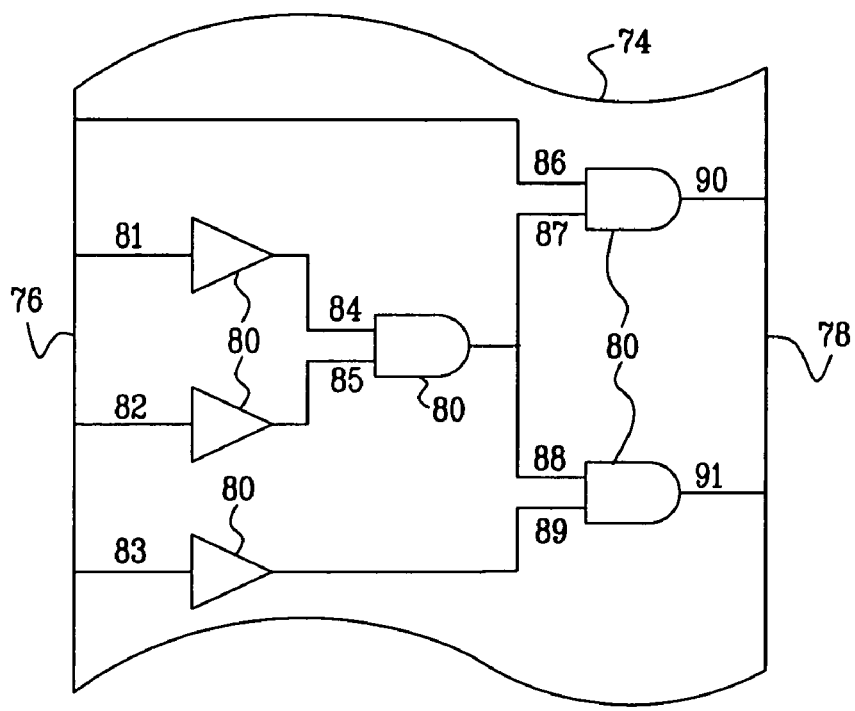
FIG. 8 is a schematic circuit diagram illustrating a circuit window in which a splitter is to be placed, in accordance with an embodiment of the present invention.
Figure 9:
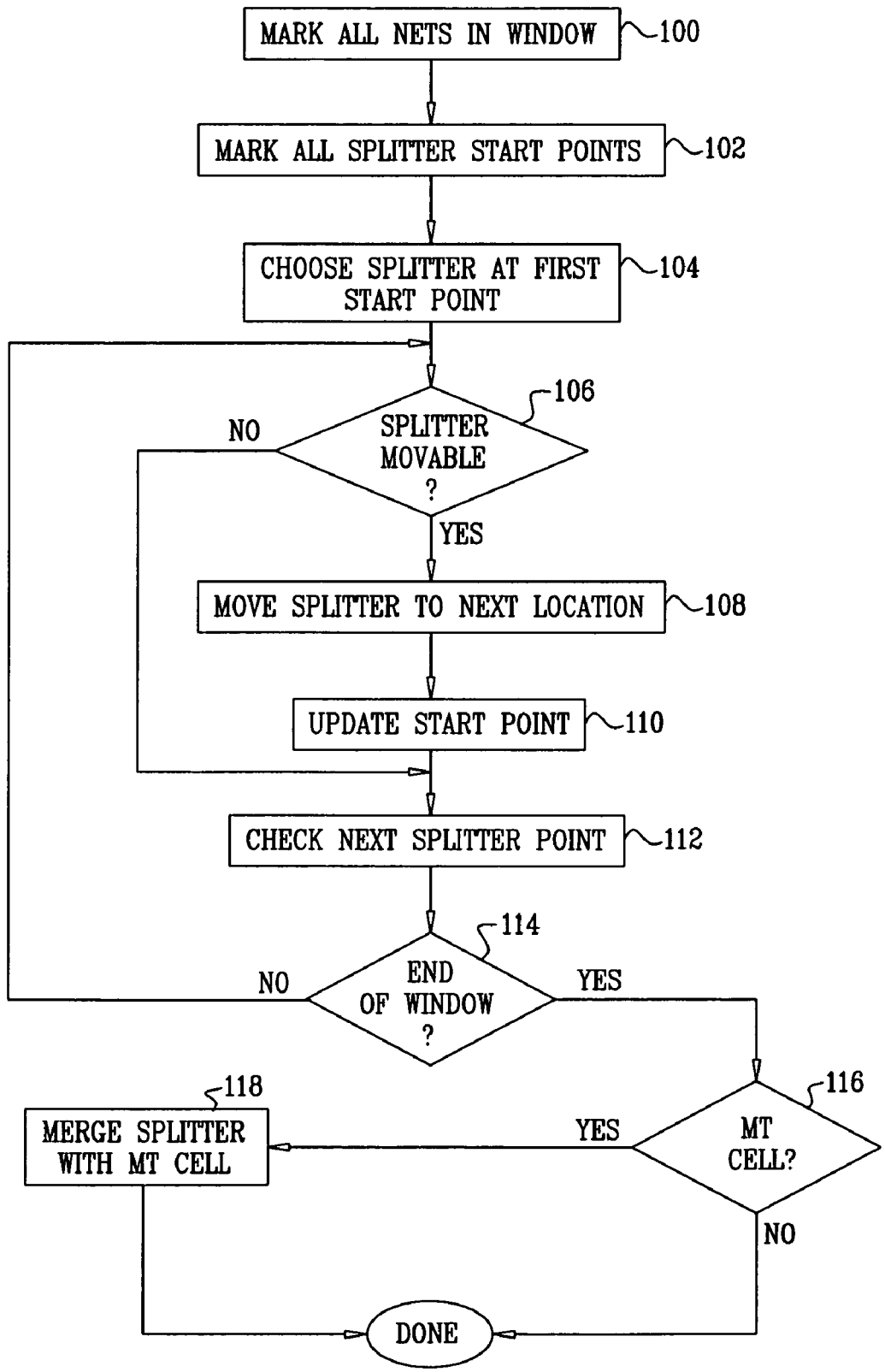
FIG. 9 is a flow chart that schematically illustrates a method for placing a splitter in a circuit window, in accordance with an embodiment of the present invention.

Reference is now made to FIGS. 8 and 9, which schematically illustrate a method for optimizing the placement of splitters within window 74, in accordance with an embodiment of the present invention. FIG. 8 is a schematic circuit diagram showing an exemplary arrangement of circuit components 80 falling within window 74, as an aid in understanding the present method. The components are interconnected at connection points 81, 82, . . . , 90, 91. (In the art of automated circuit design, such connection points are sometimes referred to as "nets.") FIG. 9 is a flow chart showing steps for choosing the connection points at which the splitters are to be inserted in the window.

The method begins with delineation of boundaries 76 and 78 based on the static timing analysis mentioned above. As a result of this analysis, processor marks all of the connection points (nets) within the window, at a net marking step 100. The processor identifies and marks the initial start points at which splitters may be inserted, at a start point marking step 102. The initial start points may be the points at which signals enter window 74 from leading boundary 76, for example. In the circuit of FIG. 8, the splitters would thus be inserted initially at points 81, 82, 83 and 86.

Processor 26 proceeds to check whether the number of splitters can be reduced by changing the start points at which splitters are placed, while still maintaining the correct phase relation among the signals. To begin this process, the processor chooses the first splitter start point, at a start point selection step 104. The first start point may be taken to be the point at which the earliest signal crosses boundary 76, for example, point 81. The processor assesses whether this splitter is movable, at a movement assessment step 106. In other words, the processor determines whether the splitter may be moved from the input of the component at which it is currently located to the output of the component, while still preserving the proper timing relation among the inputs and outputs of the components in the window. In this case, the processor initially checks whether the splitter can be moved from point 81 to point 84. It finds, however, that such a move would disrupt the timing relationship between points 84 and 85, so that this splitter move by itself is not permissible.

Therefore, processor 26 proceeds to check the next splitter point for possible movement, at a next point selection step 112. At this step, for example, the processor could choose point 82, and assess, at step 106, whether the splitters at both of points 81 and 82 could be moved to points 84 and 85, respectively. The processor will determine this move to be permissible, since it preserves the proper timing relationships among all the signals in window 74. Thus, the processor moves the splitters from points 81 and 82 to points 84 and 85, at a splitter movement step 108. This step, in the present example, does not change the number of splitters that are required in window 74.

The processor now identifies the new splitter start point that is to be analyzed next, at a new start point selection step 110. The selected point may again be the earliest point at which one of the current splitter points receives an input signal. For example, point 83 may be the new start point. The processor proceeds to check this point at step 112, and then assesses whether it would be permissible to move the splitter at point 83 to point 89 at step 106. In this case, the move will be impermissible, because it will disrupt the timing relationship between points 88 and 89.

This process continues until the splitters reach trailing boundary 78 of window 74, at a window ending step 114. In the case of the example shown in FIG. 8, the processor will find a number of candidate sets of locations for the splitters: It will first determine that three splitters could be used, at points 86, 87/88, and 89, and will ultimately determine that the splitters may be placed at points 90 and 91, while still preserving proper timing of all signals. In this latter configuration, only two splitters are required in window 74, rather than four. The processor will typically choose to choose the configuration that requires the fewest splitters, since this configuration generally consumes the smallest chip area and processing power.

Processor 26 checks whether the ultimate locations of the splitters are at the input or output of one of MT cells 40, at a merger checking step 116. As explained above in reference to FIGS. 4A and 4B, if there is a splitter on the output of a MT cell or if there are splitters on all inputs to a MT cell, the splitters may then be merged with the MT cell, at a merger step 118. In this case, the resultant number of splitters will be zero.

After all the stages of the design have been checked and optimized in this manner, the splitter placement procedure is complete. Typically, processor 26 performs additional steps in order to complete MT design 24, such as replicating registers and adding thread scheduling logic, as described, for example, in the above-mentioned PCT patent application. The splitters, register replication circuits, and logic and connections are added to the original netlist. These elements are then converted to gate-level designs, which are used to generate production masks and fabricate the MT device, using methods known in the art.

As noted earlier, the principles of the methods described above may similarly be applied in N-threaded designs, for N>2, in which case the leading and trailing boundaries of the windows for splitter placement will be defined by path lengths of T/N.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for circuit design, comprising:
    performing a timing analysis of a design of a processing stage in an integrated electronic circuit, the processing stage comprising circuit components that are interconnected at connection points;
    specifying a cycle time of the circuit;
    responsively to the cycle time and to the timing analysis, identifying a window within the processing stage containing a set of the connection points among the circuit components at which the processing stage may be split for addition of multithreading capability to the circuit; and
    selecting a subset of the connection points, and inserting splitter components at the connection points in the subset.

2. The method according to claim 1, wherein the processing stage has an input and an output, and wherein performing the timing analysis comprises determining respective input path lengths to the connection points from the input and respective output path lengths to the points from the output, and wherein identifying the window comprises finding the set of connection points having both input and output path lengths that are no greater than a predetermined fraction of the cycle time.

3. The method according to claim 2, wherein the processing stage is to be modified from single-threaded operation to dual-threaded operation, and wherein the window comprises the set of connection points having both input and output path lengths that are no greater than half the cycle time.

4. The method according to claim 2, wherein specifying the cycle time comprises increasing the specified cycle time so as to enlarge the set of connection points falling within the window.

5. The method according to claim 1, wherein inserting the splitter components comprises providing multithreading cells at an input and an output of the processing stage, and merging a splitting functionality with at least one of the multithreading cells without splitting the processing stage at any of the connection points intermediate the input and the output.

6. The method according to claim 1, wherein selecting the subset of the connection points comprises choosing the subset so as to minimize a number of the splitter components that must be inserted in the processing stage in order to enable multithreaded operation of the processing stage.

7. The method according to claim 6, wherein choosing the subset comprises analyzing two or more candidate subsets of the connection points at which the splitter components can be inserted, and selecting the subset from among the candidate subsets.

8. Apparatus for circuit design, comprising:
    an input interface, which is coupled to receive a design of a processing stage in an integrated electronic circuit, the processing stage comprising circuit components that are interconnected at connection points; and
    a design processor, which is arranged, responsively to a timing analysis of the processing stage and to a specified cycle time of the circuit, to identify a window within the processing stage containing a set of the connection points among the circuit components at which the processing stage may be split for addition of multithreading capability to the circuit, to select a subset of the connection points, and to insert splitter components at the connection points in the subset.

9. The apparatus according to claim 8, wherein the processing stage has an input and an output, and wherein the design processor is arranged, responsively to the timing analysis, to determine respective input path lengths to the connection points from the input and respective output path lengths to the points from the output, and to identify the window as comprising the set of connection points having both input and output path lengths that are no greater than a predetermined fraction of the cycle time.

10. The apparatus according to claim 9, wherein the processing stage is to be modified from single-threaded operation to dual-threaded operation, and wherein the window comprises the set of connection points having both input and output path lengths that are no greater than half the cycle time.

11. The apparatus according to claim 9, wherein the design processor is arranged to increase the specified cycle time so as to enlarge the set of connection points falling within the window.

12. The apparatus according to claim 8, wherein the design processor is arranged to place multithreading cells at the input and the output of the processing stage, and to merge a splitting functionality with at least one of the multithreading cells without splitting the processing stage at any of the connection points intermediate the input and the output.

13. The apparatus according to claim 8, wherein the design processor is arranged to select the subset so as to minimize a number of the splitter components that must be inserted in the processing stage in order to enable multithreaded operation of the processing stage.

14. The apparatus according to claim 13, wherein the design processor is arranged to analyze two or more candidate subsets of the connection points at which the splitter components can be inserted, and to select the subset from among the candidate subsets.

15. A computer software product, comprising a computer-readable medium in which program instructions are stored, which instructions, when read by a computer, cause the computer to receive a design of a processing stage in an integrated electronic circuit, the processing stage comprising circuit components that are interconnected at connection points, and to identify, responsively to a timing analysis of the processing stage and to a specified cycle time of the circuit, a window within the processing stage containing a set of the connection points among the circuit components at which the processing stage may be split for addition of multithreading capability to the circuit, and to select a subset of the connection points, and to insert splitter components at the connection points in the subset so as to enable multithreaded operation of the processing stage.

16. The product according to claim 15, wherein the digital processing stage has an input and an output, and wherein the instructions cause the computer, responsively to the timing analysis, to determine respective input path lengths to the connection points from the input and respective output path lengths to the points from the output, and to identify the window as comprising the set of connection points having both input and output path lengths that are no greater than a predetermined fraction of the cycle time.

17. The product according to claim 16, wherein the processing stage is to be modified from single-threaded operation to dual-threaded operation, and wherein the window comprises the set of connection points having both input and output path lengths that are no greater than half the cycle time.

18. The product according to claim 16, wherein the instructions further cause the computer to increase the specified cycle time so as to enlarge the set of connection points falling within the window.

19. The product according to claim 15, wherein the instructions cause the computer to place multithreading cells at the input and the output of the processing stage, and to merge a splitting functionality with at least one of the multithreading cells without splitting the processing stage at any of the connection points intermediate the input and the output.

20. The product according to claim 15, wherein the instructions cause the computer to select the subset so as to minimize a number of the splitter components that must be inserted in the processing stage in order to enable multithreaded operation of the processing stage.

21. The product according to claim 20, wherein the instructions cause the computer to analyze two or more candidate subsets of the connection points at which the splitter components can be inserted, and to select the subset from among the candidate subsets.

22. A method for circuit design, comprising:
receiving a design of a processing stage in an integrated electronic circuit, the processing stage having an input and an output with a predetermined timing relationship therebetween, and comprising circuit components, which comprise one or more splitter components and one or more storage components having connections to the input and the output;
performing a timing analysis of the design to identify a signal timing dependence between the splitter components and the storage components; and
responsively to the timing analysis, eliminating at least one of the splitter components while altering at least one of the connections of the storage components so as to preserve the timing relationship between the input and the output.

23. The method according to claim 22, wherein the splitter components comprise flip-flops.

24. Apparatus for circuit design, comprising:
an input interface, which is coupled to receive a design of a processing stage in an integrated electronic circuit, the processing stage having an input and an output with a predetermined timing relationship therebetween, and comprising circuit components, which comprise one or more splitter components and one or more storage components having connections to the input and the output; and
a design processor, which is arranged to perform a timing analysis of the design to identify a signal timing dependence between the splitter components and the storage components, and to eliminate, responsively to the timing analysis, at least one of the splitter components while altering at least one of the connections of the storage components so as to preserve the timing relationship between the input and the output.

25. The apparatus according to claim 24, wherein the splitter components comprise flip-flops.

26. A computer software product, comprising a computer-readable medium in which program instructions are stored, which instructions, when read by a computer, cause the computer to receive a design of a processing stage in an integrated electronic circuit, the processing stage having an input and an output with a predetermined timing relationship therebetween, and comprising circuit components, which comprise one or more splitter components and one or more storage components having connections to the input and the output, wherein the instructions cause the computer to perform a timing analysis of the design to identify a signal timing dependence between the splitter components and the storage components, and to eliminate, responsively to the timing analysis, at least one of the splitter components while altering at least one of the connections of the storage components so as to preserve the timing relationship between the input and the output.

27. The computer software product according to claim 26, wherein the splitter components comprise flip-flops.

* * * * *